United States Patent
Haas et al.

[11] Patent Number: 5,975,473
[45] Date of Patent: Nov. 2, 1999

[54] MOUNTING DEVICE FOR NON-CONTACTING SENSORS

[75] Inventors: Charles J. Haas, San Ramon, Calif.; Greg Gill, Beechboro, Australia; Lisle Knight, Richmond Annex; Mark Larson, Livermore, both of Calif.

[73] Assignee: Topcon Laser Systems, Inc., Pleasanton, Calif.

[21] Appl. No.: 09/041,208

[22] Filed: Mar. 12, 1998

[51] Int. Cl.$^6$ ................................................. E04G 3/00
[52] U.S. Cl. .............................................. 248/282.1; 172/4
[58] Field of Search ................ 248/282.1, 285.1, 248/274.1, 276.1, 289.11; 701/50; 172/4, 4.5; 364/528.37, 424; 367/96

[56] References Cited

U.S. PATENT DOCUMENTS

| | | | |
|---|---|---|---|
| 3,304,035 | 2/1967 | Davis | 248/276.1 X |
| 4,355,688 | 10/1982 | Hamm et al. | 172/4 |
| 5,258,961 | 11/1993 | Sehr et al. | 367/96 |
| 5,309,407 | 5/1994 | Sehr et al. | 367/96 |
| 5,579,850 | 12/1996 | Kimura et al. | 172/4 |

*Primary Examiner*—Ramon O. Ramirez
*Attorney, Agent, or Firm*—Limbach & Limbach LLP

[57] ABSTRACT

A mounting device for mounting non-contacting distance sensors to a variable-height implement of a paver or other construction vehicle is disclosed. The mounting device includes two extension arm assemblies, each extension arm assembly having an inner section and an outer section that are movable relative to each other, with the inner section being mounted to the variable-height implement. The mounting device further includes a beam assembly attached to the outer sections of the extension arm assemblies. The beam assembly includes a beam and mounting brackets for attaching a plurality of non-contacting distance sensors to the beam.

17 Claims, 8 Drawing Sheets

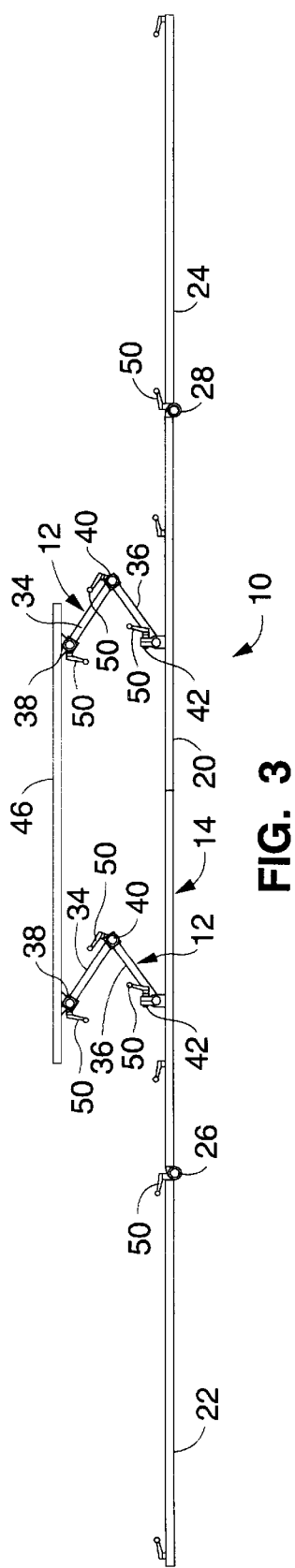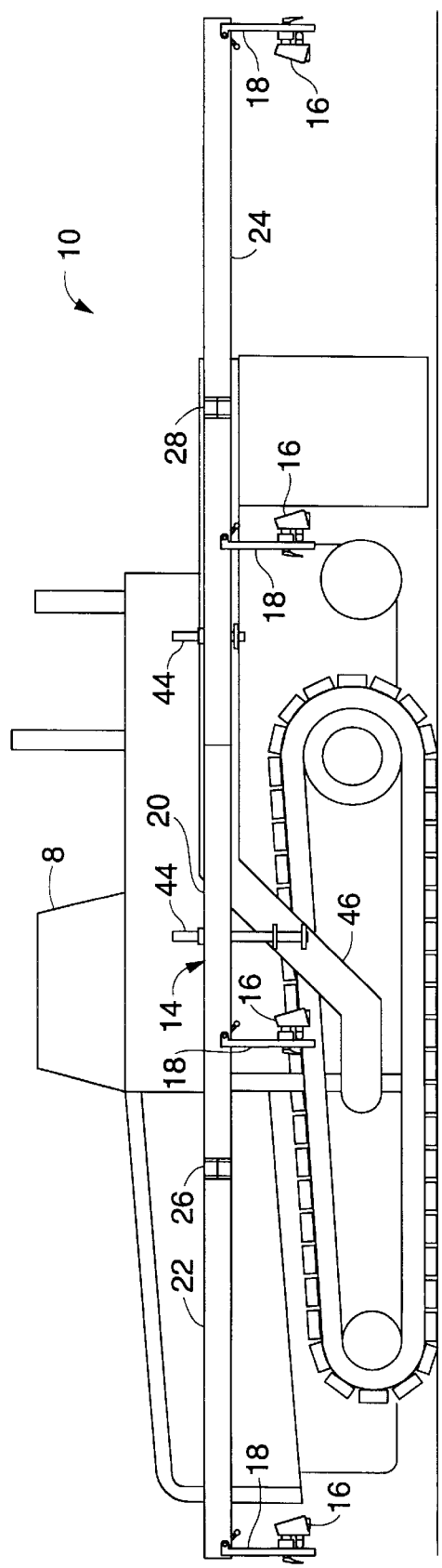
FIG. 3
FIG. 2

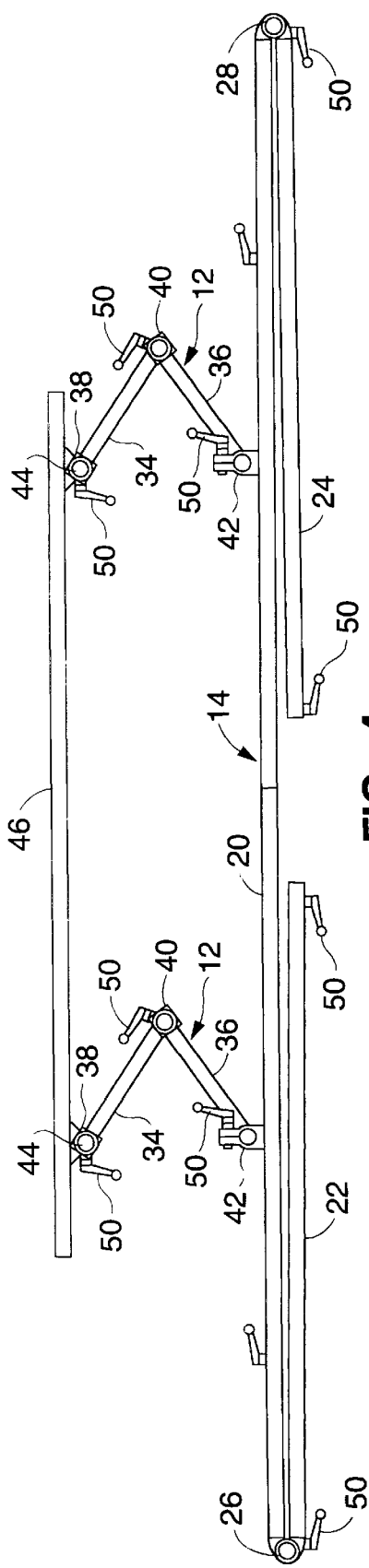
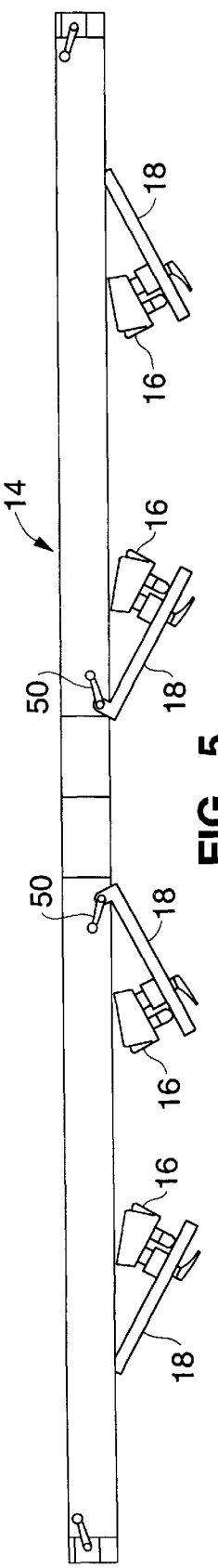
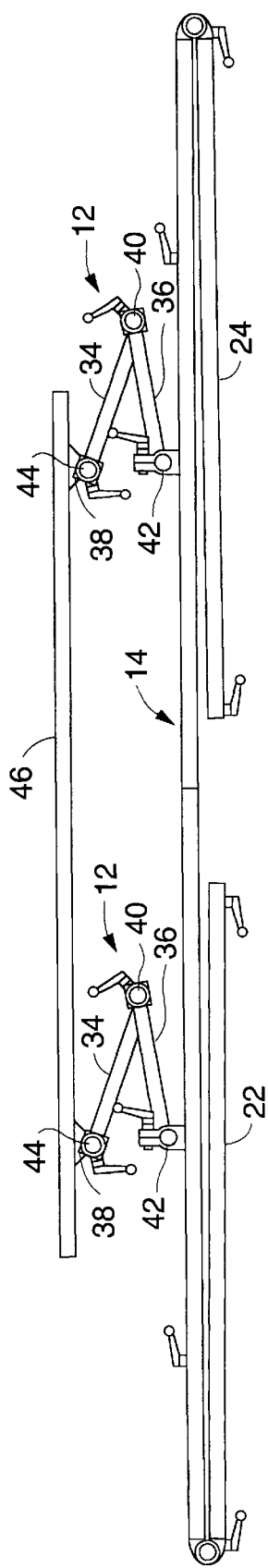
FIG. 4
FIG. 5
FIG. 6

MOUNTING DEVICE FOR NON-CONTACTING SENSORS

BACKGROUND OF THE INVENTION

1. Field of the Invention

This invention relates generally to control devices for road construction and grading vehicles, and relates more particularly to a mounting device for mounting non-contacting sensors to a paver or similar vehicle having a variable-height implement.

2. Description of the Relevant Art

Road construction equipment, such as graders and pavers, have variable-height implements that determine how much earth is graded or how much pavement is laid. A paver, for example, has a variable-height screed that governs the thickness of paving material put down by the paver. When the screed is raised, more paving material is applied. Conversely, when the screed is lowered, less paving material is applied.

It is important to control the height of a variable-height implement in order to obtain the desired graded or paved surface. For a paver, the desired result is a uniform, smooth mat having a specified minimum thickness and being level with any adjacent mats. It is common to use an automatic control system to control the height of a variable-height implement. Such an automatic control system typically takes measurements of the height of the implement as an input, compares the measured height to a reference to determine any positioning error, and adjusts the height of the implement up or down to minimize the error.

Both contacting and non-contacting devices have been used with road construction equipment to measure implement height. An ultrasonic transducer is used in U.S. Pat. No. 4,733,355 to measure the height of a grading implement relative to ground or a stringline. With a paver, it is common to use a contacting device known as a ski to measure the height of the screed. The ski, which is typically 20 to 30 feet long (although it may be longer or shorter), is dragged along the ground or pavement next to the paver, and gives an averaged height of the ground it is traversing. The ski is mechanically linked to the paver and its height is used to control the height of the screed. Some skis have multiple feet or wheels that contact the ground.

Using a ski to control the variable-height screed of a paver has problems, however. The contacting surface of a ski can pick up asphalt or debris that lifts the ski, causing a measurement error. Also, it is difficult to avoid or work around obstacles such as manholes or storm drains when using a ski, or to get accurate readings over rough pavement. Sometimes a ski may interfere with the area to be paved, resulting in gaps that have to be filled in by hand. Using a ski also makes it difficult to maneuver the paver, especially backing up.

It is known to use multiple non-contacting sensors in conjunction with controlling variable-height implements. U.S. Pat. No. 5,258,961, for example, discloses a control unit that includes three sonic sensors mounted to the side of a road surfacing machine or paver as a substitute for a ski. The sensors of the '961 patent are mounted to the paver, without any means disclosed for adjusting their positions relative to the paver.

SUMMARY OF THE INVENTION

In accordance with the illustrated preferred embodiment, the present invention is a mounting device for mounting non-contacting distance sensors to a variable-height implement of a paver or other construction vehicle. The mounting device includes two extension arm assemblies, each extension arm assembly having an inner section and an outer section that are movable relative to each other, with the inner section being mounted to the variable-height implement. The mounting device further includes a beam assembly attached to the outer sections of the extension arm assemblies. The beam assembly includes a beam and mounting brackets for attaching a plurality of non-contacting distance sensors to the beam.

In the preferred embodiment, the extension arm assemblies have two sections or arms, each mounted by hinged clamping assemblies to the implement, to the other arm, and to the beam assembly. The hinged clamping assemblies lock the arms in position when the clamps are engaged, and permit the arms to rotate with respect to the mounting when the clamps are released. This mounting arrangement allows an operator to easily and rapidly adjust the position of the beam assembly relative to the paver. The beam assembly can be moved laterally anywhere from a position next to the paver with the arms folded, to a position away from the paver with the extension arms fully extended, and anywhere in between. Vertical and longitudinal adjustments of the beam assembly can also be made easily. When the beam assembly has been moved to the desired position, it is locked in place by engaging the clamps.

Also in the preferred embodiment, the ends of the beam assembly include two outer beams that can be folded inward to reduce the length of the beam assembly for easier transport. The two outer beams are coupled to an inner beam by two hinged clamping assemblies, similar to the clamping assemblies of the extension arms. In addition to folding, one of the outer beams can be angled inward to position one of the non-contacting distance sensors behind the paver to monitor the newly-laid mat of asphalt.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 2 is side view of the mounting device of the present invention mounted on a paver.

FIG. 3 is a top view of the mounting device of the present invention, shown with a beam assembly extended.

FIG. 4 is a top view of the mounting device of the present invention, shown with the ends of the beam assembly folded.

FIG. 5 is a side view of the mounting device as shown in FIG. 4.

FIG. 6 is a top view of the mounting device of the present invention, shown with extension arms folded.

DETAILED DESCRIPTION OF THE PREFERRED EMBODIMENTS

FIGS. 1 through 12 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
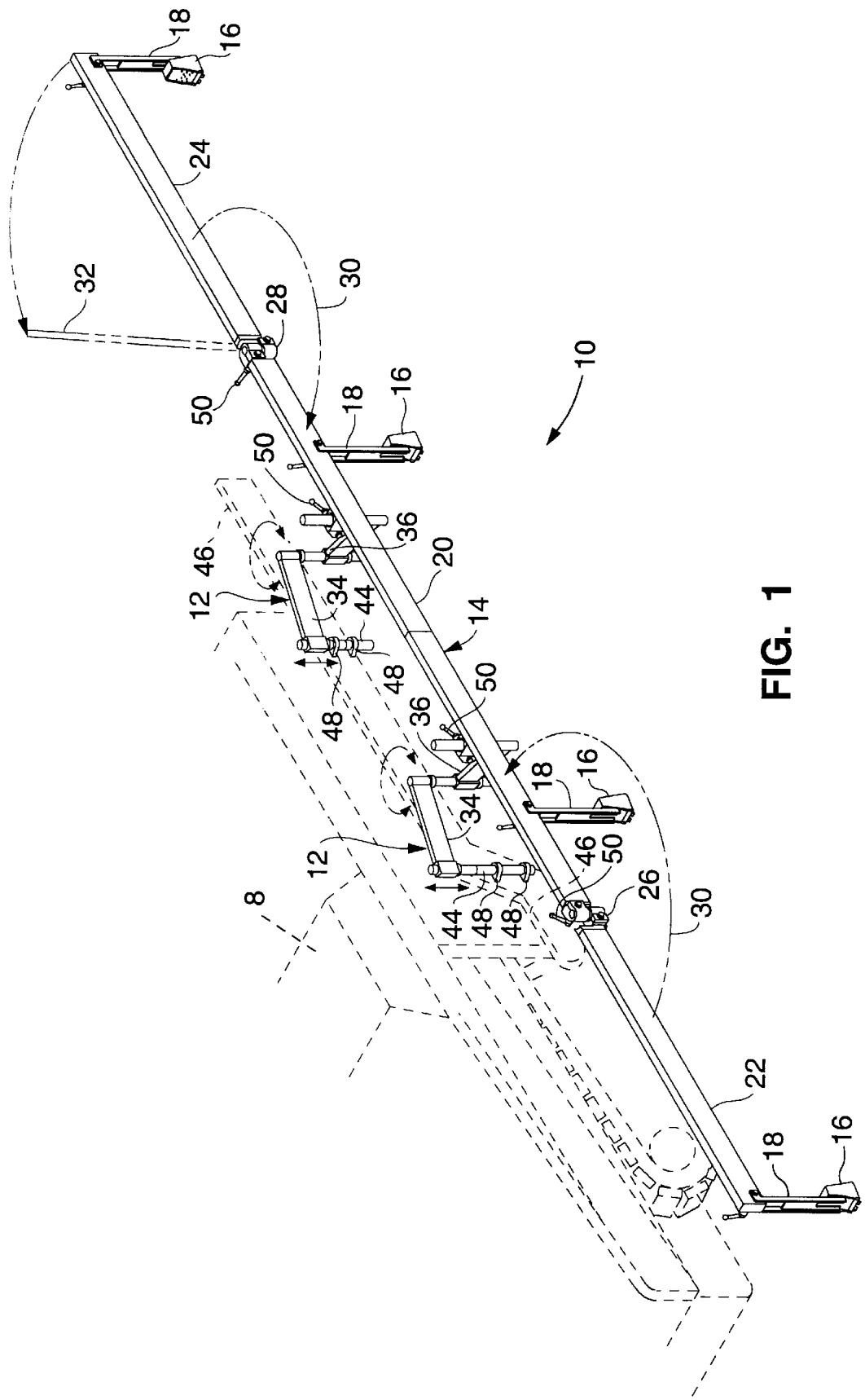
FIG. 1 is a perspective view of a mounting device for mounting non-contacting distance sensors, according to the present invention, mounted on a paver.

The preferred embodiment of the present invention is a mounting device for mounting non-contacting distance sensors to a variable-height implement of a paver 8 or other construction vehicle. As shown in FIGS. 1–3, the mounting device 10 includes two extension arm assemblies 12 and a beam assembly 14. Four non-contacting distance sensors 16 are mounted to the beam assembly 14 on brackets 18. The beam assembly 14 includes an inner beam 20 and two outer beams 22 and 24 that are mounted on the two ends of the inner beam by hinged clamping assemblies 26 and 28. Releasing the hinged clamping assemblies 26 and 28 permit the end beams 22 and 24 to be rotated about the ends of the inner beam 20 as shown by arrows 30 (FIG. 1). Also, the aft outer beam 24 can be pivoted inward and locked at a position 32 where the sensor 16 is positioned behind the rear of the paver.

As best shown in FIGS. 1, 3, and 4, the extension arm assemblies 12 each include an inner arm or section 34, and outer arm or section 36, and three hinged clamping assemblies 38, 40, and 42. As shown in FIG. 1, two vertical pivot posts 44 are attached to a tow arm 46 of the paver. The posts 44 are preferably welded to the tow arm 46 with brackets 48. Each of the clamping assemblies has a handle 50 that is turned to loosen the clamp to disengage it and to tighten the clamp to engage it and lock the arm in position.

FIGS. 3 and 4 show the mounting device 10 in two positions, in-line and folded. In FIG. 3, the outer beams 22 and 24 are positioned in line with the inner beam 20 so that the four sensors 16 are in line. This is the position of the mounting device 10 when the sensors are to be used to control the height of the screed of the paver. In FIG. 4, the outer beams 22 and 24 are folded inward to the inner beam 20, which reduces the overall length by about half when the sensors are not in use. To fold or unfold the outer beams 22 and 24, the handle 50 of the hinged clamping assembly 26 or 28 is loosened, the outer beam is rotated about the hinged clamping assembly to either its folded or in-line position, and the handle is tightened to lock the outer beam in position.

FIG. 5 illustrates folding of the brackets 18 holding the four non-contacting distance sensors 16. As shown in FIG. 1, the brackets 18 are positioned vertically when the sensors 16 are in use. When the sensors 16 are not in use, the brackets 18 may be folded upward, as shown in FIG. 5. The bracket 18 is shown in more detail in FIG. 9. A plate 52 has a slot 54 for mounting a sensor 16. The sensor 16 can be moved vertically along the slot 54, or it can be removed from the bracket. The bracket is mounted to the beam 14 by a hinged clamp that includes two mounting holes 56 in the plate 52, a hole 58 in the beam, a bolt 60 that is inserted through the holes, and a handle 50 on the threaded end of the bolt. The bolt 60 is constrained so that it does not turn when the handle 50 is turned. Loosening the handle 50 permits the bracket position to be changed; tightening the handle locks the bracket in position.

Figure 12:
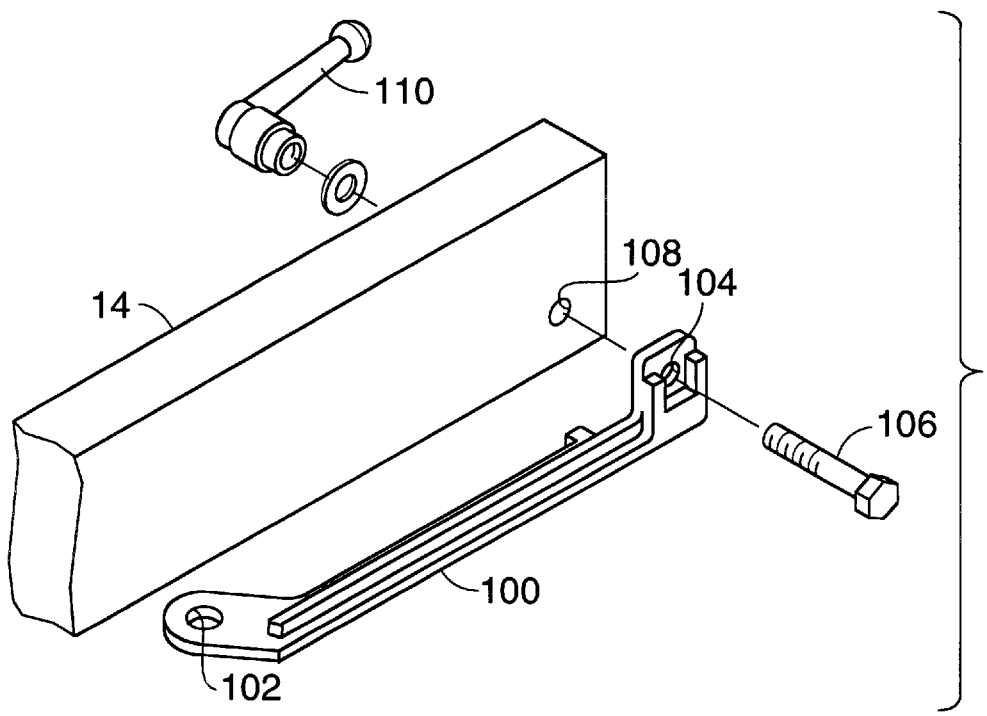
FIG. 12 is a detail view of an alternative bracket for mounting a non-contacting distance sensor to the beam assembly.
Figure 13:
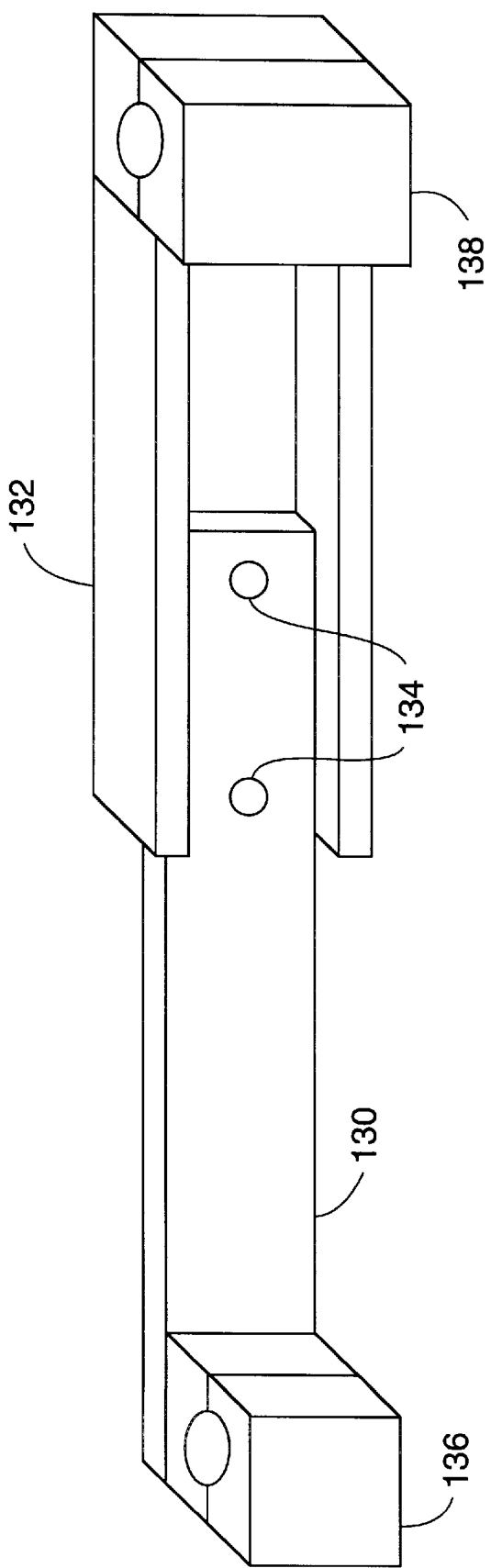
FIG. 13 is a perspective view of an extension arm assembly having telescoping arms.

An alternative design for the sensor-mounting bracket is shown in FIG. 12. An arm 100 has a hole 102 for mounting a sensor 16 and another hole 104 for mounting the arm to the beam 14. A bolt 106 is inserted through the hole 104 in the arm 100 and through a hole 108 in the beam. A handle 110 is threaded onto a threaded end of the bolt 106. The head of the bolt 106 is constrained so that it does not turn when the handle 110 is turned. Loosening the handle 110 loosens the clamp and permits the bracket position to be changed; tightening the handle locks the bracket in position.

FIGS. 4 and 6 illustrate the lateral adjustability of the mounting device 10. By releasing the hinged clamping assemblies 38, 40, and 42 of the extension arm assemblies 12, the beam assembly 14 can be moved away from or closer to the tow arm 46 of the paver. The two extension arm assemblies 12 are independently adjustable, so the beam assembly can be rotated somewhat in a horizontal plane to position it parallel or oblique to the tow arm 46. Furthermore, since each arm 34 and 36 of the extension arm assemblies 12 can rotate independently about the clamping assemblies 38, 40, and 42, the beam assembly 14 can be moved forward or rearward relative to the tow arm. Once the beam assembly 14 is in the desired position, it is locked in place by engaging the clamping assemblies 38, 40, and 42.

Figure 7A:
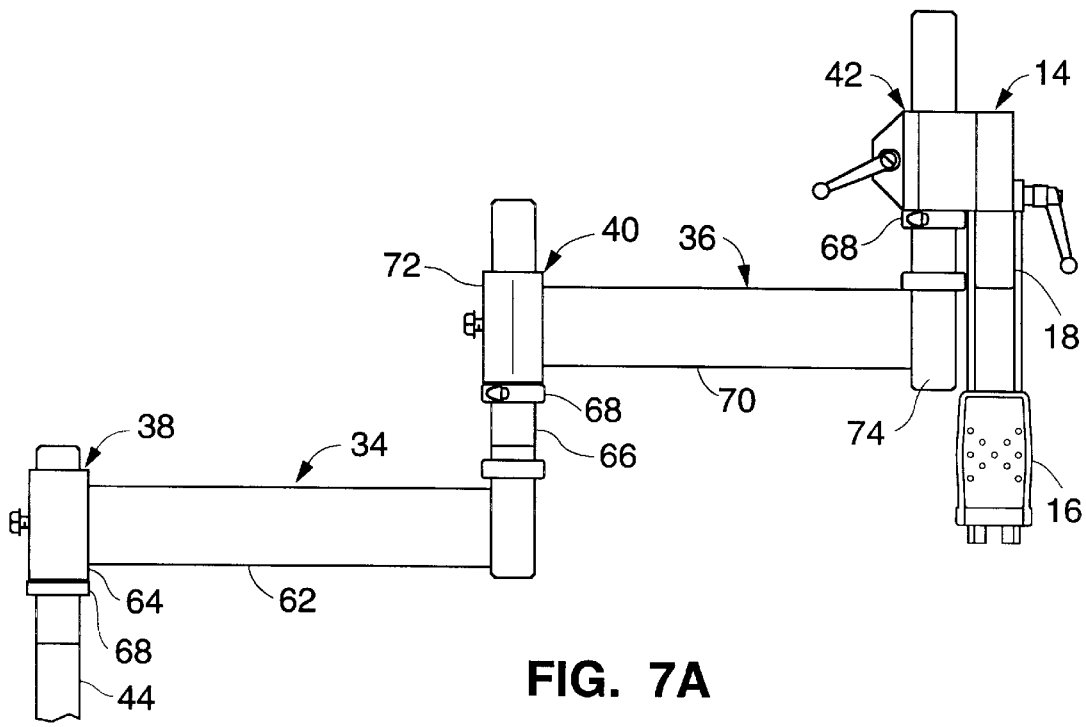
FIG. 7A is a front view of an extension arm assembly of the present invention, shown in one orientation.
Figure 7B:
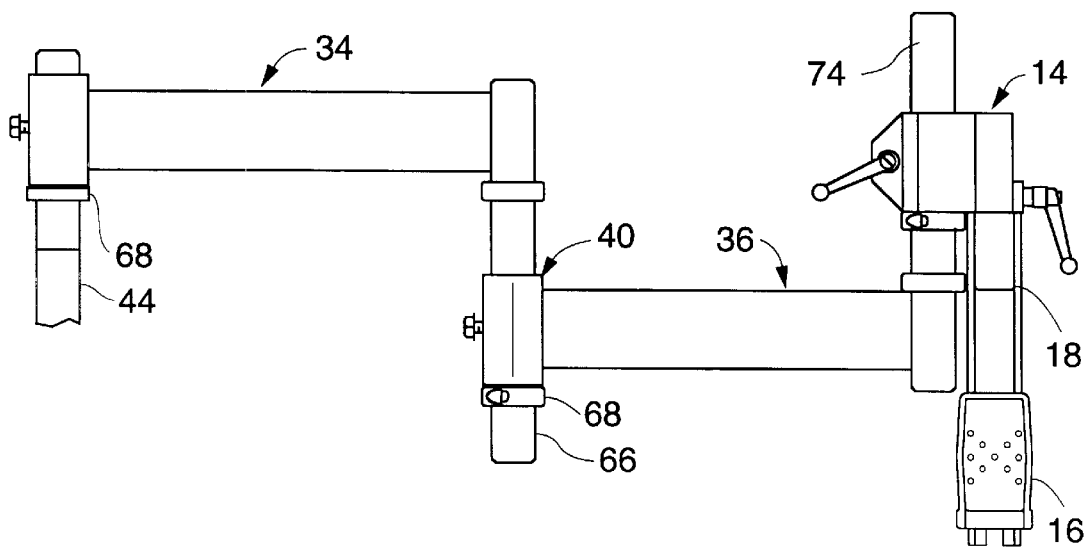
FIG. 7B illustrates the extension arm assembly in another orientation.

FIGS. 7A and 7B illustrate the extension arm assemblies 12 and hinged clamping assemblies 38, 40, and 42 in more detail. The inner arm 34 includes a horizontal plate 62, a clamp 64 at one end of the plate, and a vertical pivot post 66 at the other end of the plate. The clamp 64 engages the vertical pivot post 44 that is attached to the tow arm 46 of the paver. The clamp 64 has a collar that is tightened or loosened around the pivot post 44 by a screw arrangement that is actuated by a handle 50 (FIG. 4). The clamp 64 rests on a locking collar 68 that is clamped to the pivot post 44. When the angular position of the arm 34 is to be adjusted, the clamp 64 is loosened or disengaged, the arm 34 is pivoted about the pivot post 44 to the desired position, and the clamp 64 is tightened or engaged. If the vertical position of the inner arm 34 needs to be adjusted, then the locking collar 68 is loosened, moved to a new position, and tightened again.

The outer arm 36 is constructed like the inner arm 34. The outer arm 36 has a horizontal plate 70, a clamp 72 at one end of the plate, and a vertical pivot post 74 at the other end of the plate. The clamp 72 engages the pivot post 66 of the inner arm 34. The clamp 72 rests on a locking collar 68 that is clamped to the pivot post 66. The hinged clamping assembly 40 operates like the hinged clamping assembly 38 described above.

Figure 8:
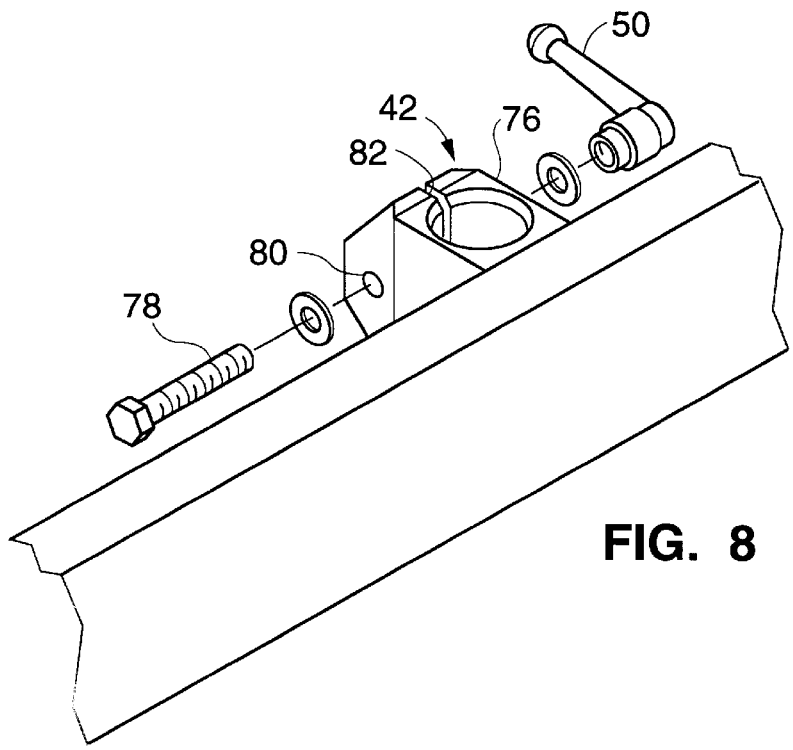
FIG. 8 is a detail view of a clamp which attaches the beam assembly to the extension arm assembly.
Figure 9:
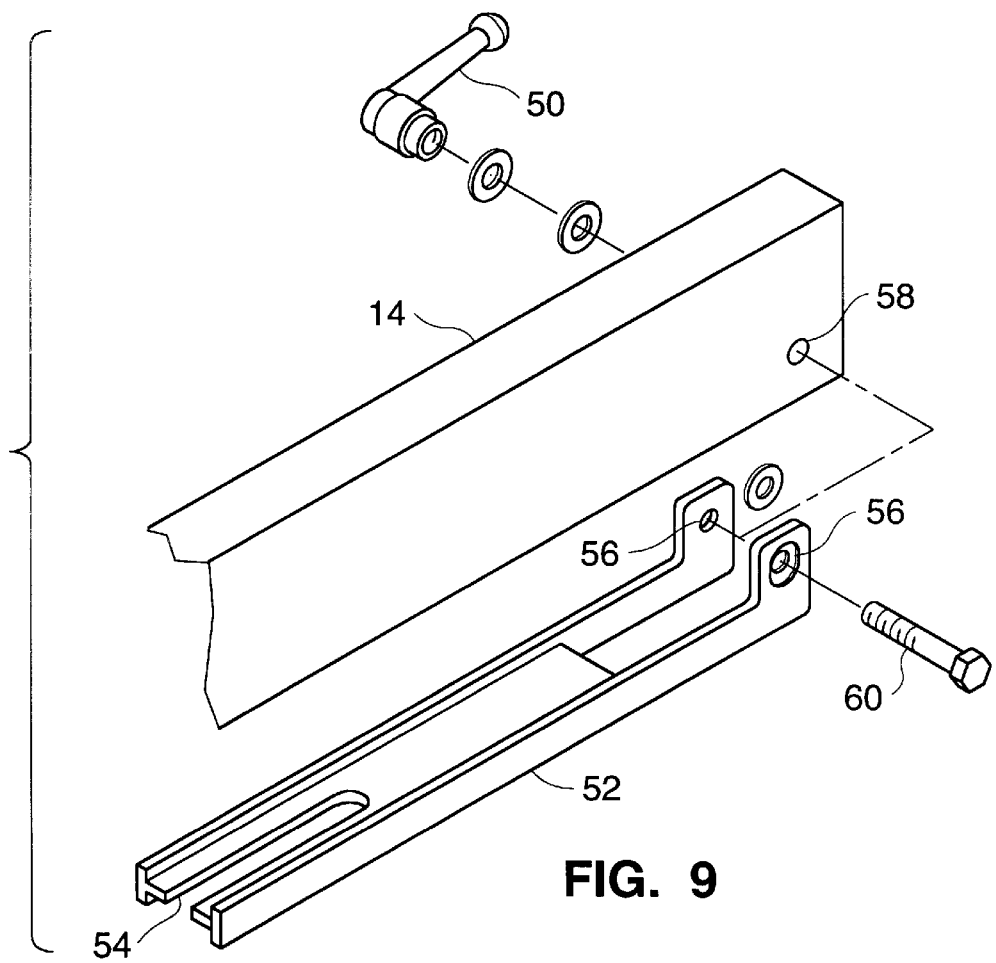
FIG. 9 is a detail view of a bracket for mounting a non-contacting distance sensor to the beam assembly.

The pivot post 74 of the outer arm 36 supports the beam assembly 14. The clamping assembly 42 that clamps the beam assembly 14 to the pivot post 74 is shown in FIG. 8. The clamping assembly 42 includes a split collar 76 that has an inner surface that engages the pivot post 74 when the clamp is engaged. A bolt 78 is inserted into a hole 80 in the collar, and the handle 50 is threaded on the end of the bolt. The bolt 78 is constrained so that it does not turn when the handle 50 is turned. There is a gap 82 in the clamp that allows the collar to close around and engage the pivot post 74 when the handle is tightened on the bolt 78. Like the other clamps 38 and 40, clamping assembly 42 rests on a locking collar 68 that vertically supports the beam assembly when the clamp is disengaged.

Figure 11:
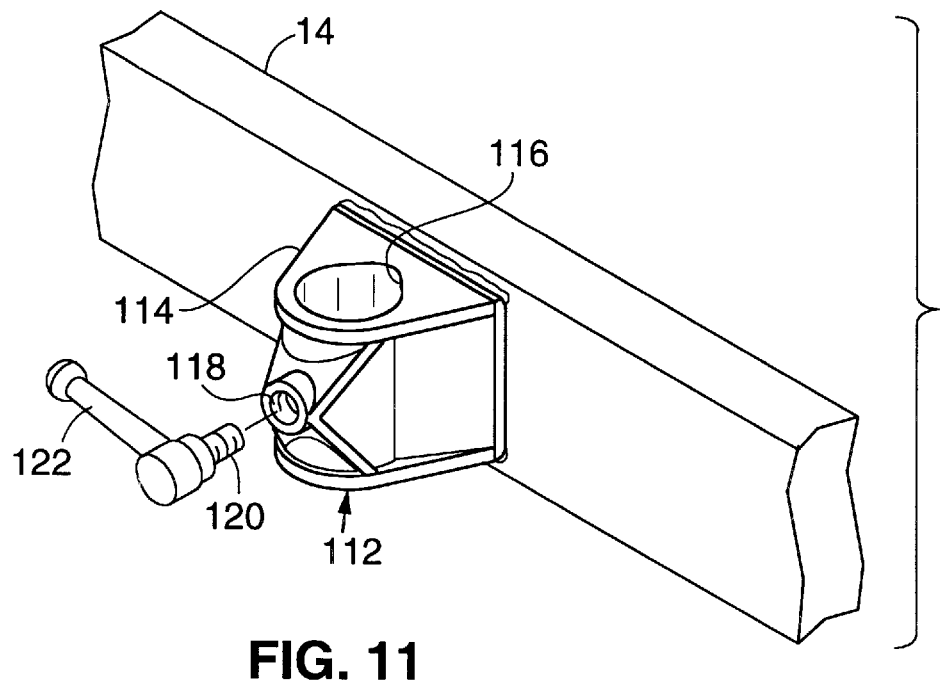
FIG. 11 is a detail view of an alternative clamp which attaches the beam assembly to the extension arm assembly.

An alternative design for the clamp 42 is shown in FIG. 11. Clamping assembly 112 includes a casting 114 having a vertical hole 116 that receives the pivot post 74. The casting 114 is joined to the beam 14 by welding or other means. A side of the casting opposite the beam has a threaded hole 118 that receives an externally threaded post 120 of a handle 122. To lock the pivot post 74 to the clamping assembly 112, the handle 122 is turned until the threaded post 120 engages the post.

The inner and outer arms 34 and 36 can be oriented with one or both pivot posts 66 and 74 pointing downward instead of the upward orientation shown in FIG. 7A. In FIG. 7B, the inner arm 34 is inverted so that the pivot post 66 is pointing downward. The locking collar 68 is clamped to the pivot post 66 below the clamping assembly 40 of the outer arm 36 to support the weight of the outer arm when the clamp 40 is disengaged. This arrangement lowers the height of the beam assembly 14 and sensors 16 relative to the tow arm 46 of the paver. The outer arm 36 can be oriented with its pivot post 74 pointing downward, if desired, to further reduce the height of the beam assembly and sensors.

Figure 10:
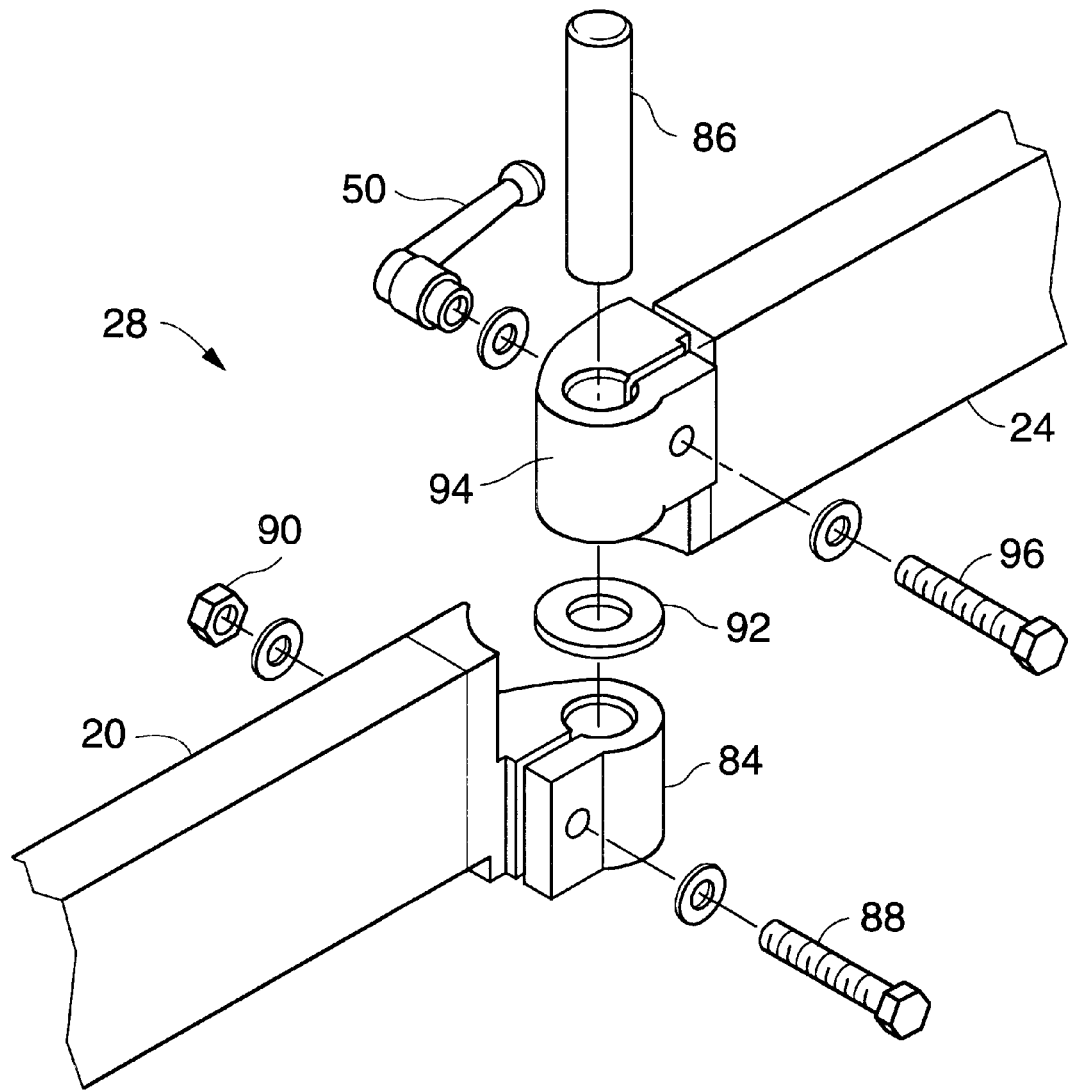
FIG. 10 is a detail view of a clamp assembly used to mount the ends of the beam assembly.

The hinged clamping assembly 28 is shown in more detail in FIG. 10. The hinged clamping assembly 26 at the other end of the beam is constructed like the clamping assembly 28 shown in FIG. 10. An end of the inner beam 20 has a collar 84 that clamps onto the lower end of a vertical pivot post 86. A bolt 88 and nut 90 arrangement provides the clamping force to clamp onto the post 86. A thrust washer 92 is located on the pivot post 86 on top of the collar 84. A collar 94 of the outer beam 24 engages and clamps onto the pivot post 86. A bolt 96 and handle 50 provide the clamping force to clamp the collar 94 onto the pivot post 86. When the handle 50 is loosened on the bolt 96, the clamping assembly 28 is disengaged and the outer beam 24 can be rotated with respect to the inner beam 20 to either fold it (as shown in FIGS. 4–6) or to position one sensor 16 behind the paver (as shown in dashed lines in FIG. 1). When the handle 50 is tightened onto the bolt 96, the clamping assembly 28 is engaged and locks the position of the outer beam 24.

Alternative arrangements for the extension arm assemblies and beam assembly can be made. For example, the extension arm assembly can be constructed with two telescoping sections, with one section 130 mounted to the tow arm of the paver and the other section 132 mounted to the beam assembly as shown in FIG. 8. Sliding the telescoping sections provides lateral movement of the beam assembly relative to the paver. Releasable clamps 134 lock the two sections 130, 132 together, and releasable clamps 136 and 138 attach the extension arm assembly to the implement and beam assembly, respectively. Also, the outer beams could be telescoping sections that slide relative to the inner beam. With such an arrangement, the outer beams can be extended when the sensors are in use, and retracted into the inner beam when the sensors are not in use. Furthermore, although the inner beam 20 is shown as a unitary structure, it may be composed of shorter beam sections that are joined or fastened together, which would permit the inner beam to be disassembled into shorter components.

From the above description, it will be apparent that the invention disclosed herein provides a novel and advantageous mounting device for mounting non-contacting distance sensors to a variable-height implement of a paver or similar vehicle. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A device for mounting non-contacting distance sensors to a paver or similar vehicle having a variable-height implement whose height is controllable by a control system coupled to the distance sensors, said device comprising:

two extension arm assemblies, each extension arm assembly having an inner section and an outer section that are movable relative to each other and interconnected by a releasable clamp;

means for mounting the inner section of each extension arm assembly to the variable-height implement;

means for attaching the outer section of each extension arm assembly to a beam assembly; and a beam assembly including a beam and means for attaching a plurality of non-contacting distance sensors to the beam.

2. A device as recited in claim 1 wherein the means for mounting the inner section of each extension arm assembly to the variable-height implement includes a first hinged clamping assembly that is locked in position when engaged and movable when released.

3. A device as recited in claim 2 wherein the first hinged clamping assembly includes a vertical post and a clamp, with the vertical post affixed to the variable-height implement or the inner section and the clamp affixed to the other, wherein the first hinged clamping assembly clamps the inner section to the variable-height implement when engaged and permits rotation and vertical movement about the post when released.

4. A device as recited in claim 1 wherein the inner and outer sections of each extension arm assembly are coupled together by a second hinged clamping assembly that is locked in position when engaged and movable when released.

5. A device as recited in claim 4 wherein the second hinged clamping assembly includes a vertical post and a clamp, with the vertical post affixed to one of the sections and the clamp affixed to the other section, wherein the second hinged clamping assembly clamps the inner and outer sections when engaged and permits rotation and vertical movement about the post when released.

6. A device as recited in claim 1 wherein the means for attaching the outer section of each extension arm assembly to the beam assembly includes a third hinged clamping assembly that is locked in position when engaged and movable when released.

7. A device as recited in claim 6 wherein the third hinged clamping assembly includes a vertical post and a clamp, with the vertical post affixed to the beam assembly or the outer section and the clamp affixed to the other, wherein the third hinged clamping assembly clamps the outer section to the beam assembly when engaged and permits rotation and vertical movement about the post when released.

8. A device as recited in claim 1 wherein the inner and outer sections of each extension arm assembly fit together in a telescoping arrangement so that the outer section can slide relative to the inner section, and wherein each extension arm assembly includes means for releasably clamping the inner and outer sections.

9. A device as recited in claim 1 wherein the means for mounting the inner sections of the extension arm assembly to the variable-height implement includes two vertical posts affixed to the variable-height implement and accessible from above, includes a locking collar attached to each vertical post, and includes a clamp affixed to each inner section and having a bore that receives and releasably clamps to a vertical post and a bottom surface that is supported by the locking collar on the post.

10. A device as recited in claim 1 wherein the beam assembly includes an inner beam having two ends and two outer beams releasably coupled to the ends of the inner beam.

11. A device as recited in claim 10 wherein the inner and outer beams of the beam assembly are coupled together by hinged clamping assemblies that are locked in position when engaged and movable when released.

12. A device as recited in claim 11 wherein each hinged clamping assembly includes a vertical post and a clamp, with the vertical post affixed to one of the beams and the clamp affixed to the other beam, wherein the clamping assembly clamps the inner and outer beams when engaged and permits rotation about the post when released.

13. A device as recited in claim 10 wherein the inner beam includes two beam sections fastened together.

14. A device as recited in claim 10 wherein the inner and outer beams fit together in a telescoping arrangement so that the outer beam can slide relative to the inner beam, and further including means for releasably clamping the inner and outer beams.

15. A device as recited in claim 1 wherein the means for attaching each non-contacting distance sensor includes a mounting bracket coupled to the beam assembly by a clamping assembly that is locked in position when engaged and is movable when released.

16. A device for mounting non-contacting distance sensors to a paver or similar vehicle having a variable-height implement whose height is controllable by a control system coupled to the distance sensors, said device comprising:

two extension arm assemblies, each extension arm assembly having an inner arm that is mounted to the variable-height implement by a hinged clamp and an outer arm that is mounted to the inner arm by a hinged clamp;

a beam assembly that is mounted to the outer arms of each extension arm assembly by a hinged clamp, wherein the beam assembly includes an inner beam having two ends and two outer beams mounted to the ends of the inner beam by hinged clamps; and means for attaching a plurality of non-contacting distance sensors to the beam assembly.

17. A device as recited in claim 16 wherein each hinged clamp locks in position when engaged and permits rotation when released, and wherein each hinged clamp includes a handle for engaging and releasing the clamp.

* * * * *